United States Patent [19]

Newbury et al.

[11] Patent Number: 6,093,355
[45] Date of Patent: Jul. 25, 2000

[54] MANUFACTURE OF EXTRUDED ARTICLES

[75] Inventors: John Paul Newbury, Cumbria; Thomas Dovey, Coventry, both of United Kingdom

[73] Assignee: Acordis Fibres (Holdings) Limited, United Kingdom

[21] Appl. No.: 09/242,186

[22] PCT Filed: Aug. 12, 1997

[86] PCT No.: PCT/GB97/02173

§ 371 Date: Feb. 9, 1999

§ 102(e) Date: Feb. 9, 1999

[87] PCT Pub. No.: WO98/06886

PCT Pub. Date: Feb. 19, 1998

[30] Foreign Application Priority Data

Aug. 14, 1996 [GB] United Kingdom .................. 9617043

[51] Int. Cl.$^7$ .......................... B29C 47/00; D01D 10/06; D01F 2/02
[52] U.S. Cl. ............... 264/187; 264/211.15; 264/211.18; 264/233
[58] Field of Search ................... 264/187, 203, 264/211.15, 211.18, 233

[56] References Cited

U.S. PATENT DOCUMENTS 3,758,458  9/1973  Dyer .......................................... 536/57
4,983,730  1/1991  Domeshek .............................. 536/69

FOREIGN PATENT DOCUMENTS 648808  4/1995  European Pat. Off. .

*Primary Examiner*—Leo B. Tentoni
*Attorney, Agent, or Firm*—Howson and Howson

[57] ABSTRACT

Use in the manufacture of extruded lyocell articles of cellulose having a value of Pipe Flow Index (as defined) to Jet Flow Index (as defined) in the range from 0.85 to 6 can offer a number of advantages, particularly in cellulose solution transport and in spinning stability. Pipe Flow Index is designed to assess the flow performance of cellulose solution under low shear conditions typically experienced in transfer pipework. Jet Flow Index is designed to assess the flow performance of cellulose solution under high shear conditions typically experienced during extrusion. The extruded lyocell articles are made by a method which includes the steps of:

(1) dissolving cellulose in an aqueous tertiary amine N-oxide solvent to form a solution;
(2) extruding the solution through a die by way of a gaseous gap into a coagulating bath to form an extruded lyocell precursor;
(3) washing the extruded lyocell precursor free from tertiary amine N-oxide; and
(4) drying the washed lyocell precursor, thereby forming the extruded lyocell article.

9 Claims, No Drawings

MANUFACTURE OF EXTRUDED ARTICLES

FIELD OF THE INVENTION

This invention relates to methods for the manufacture of extruded lyocell articles such as fibres and films, wherein a solution of cellulose in an aqueous tertiary amine N-oxide solvent is extruded through a die into a coagulating bath. Lyocell is the generic name for cellulose produced by solvent extrusion or solvent-spinning processes of this kind. Tertiary amine N-oxides are hereinafter on occasion referred to for convenience as amine oxides.

BACKGROUND ART

The manufacture of shaped polymer articles by extrusion of a solution of cellulose in an aqueous tertiary amine N-oxide solvent (which solution may also be called a dope) into an aqueous coagulating bath is described for example in U.S. Pat. No. 4,246,221, the contents of which are incorporated herein by way of reference. Conventional dissolving-grade cellulose, for example in the form of woodpulp and cotton linters, is utilised as raw material in such processes.

EP-A-0,648,808 points out that the extrusion conditions for such solutions must be chosen to provide freedom from melt flow instability in the extrusion orifice, which can result in melt fracture and consequential production breakdown (loss of spinning stability). Melt flow instability can be countered without reducing extrusion productivity by reducing the viscosity of the solution, for example by reducing the concentration or degree of polymerisation (D.P.) of the cellulose in the solution. Such reduction also permits increases in the draft ratio which can be applied to extruded fibres and in the take-up velocity of such fibres. Nevertheless, such reduction is attended by disadvantages elsewhere in the process, notably by reductions in productivity and by increases in the load on the solvent recovery system. EP-A-0,648,808 describes a solution of cellulose in aqueous N-methylmorpholine N-oxide, wherein the cellulose comprises a mixture of (1) a first cellulose component having a degree of polymerisation (D.P.) in the range from 500 to 2000, and (2) a second cellulose component having a D.P. in the range from 350 to 900, with the proviso that the ratio of the D.P. of component (2) to the D.P. of component (1) is no greater than 0.9:1, the ratio by weight of component (1) to component (2) being in the range from 95:5 to 50:50. It is said that such solutions can be extruded at high velocity with process stability to yield lyocell fibres with mechanical properties similar to those produced by conventional lyocell processes.

DISCLOSURE OF THE INVENTION

According to the invention there is provided a method for the manufacture of an extruded lyocell article which comprises the steps of:

(1) dissolving cellulose in an aqueous tertiary amine N-oxide solvent to form a solution;

(2) extruding the solution through a die by way of a gaseous gap into a coagulating bath to form an extruded lyocell precursor;

(3) washing the extruded lyocell precursor free from tertiary amine N-oxide; and (4) drying the washed lyocell precursor, thereby forming the extruded lyocell article, characterised in that the cellulose exhibits a ratio of Pipe Flow Index (as defined in Test Method 2) to Jet Flow Index (as defined in Test Method 3) in the range from 0.85 to 6.0.

Pipe Flow Index (PFI) is designed to assess the flow performance of a cellulose solution under low-shear conditions of the kind typically experienced in transfer pipework in a manufacturing plant. Jet Flow Index (JFI) is designed to assess the flow performance of a cellulose solution under high-shear conditions of the kind typically experienced in a spinnerette or other extrusion die. In both cases, higher Index values correspond to an increased flow rate at a given pressure or to a lower required pressure to induce a given flow rate.

The tertiary amine N-oxide is preferably N-methylmorpholine N-oxide (NMMO). The amount of cellulose in the solution is preferably in the range from 5 to 25, more preferably from 10 to 20, percent by weight. The amount of water in the solution is often in the range from 7 to 14 percent by weight, although it will be appreciated from the known behaviour of cellulose/NMMO/water compositions that the acceptable range of water concentration may vary with cellulose concentration.

The dissolution, extrusion, washing and drying steps may be performed in conventional manner.

The cellulose solution may conveniently be made by dispersing cellulose in a 60/40 mixture of NMMO and water to form a slurry or premix, followed by evaporative removal of excess water, for example in a thin-film evaporator such as a Filmtruder (Trade Mark of Buss AG) to yield the desired solution.

The gas in the gaseous gap is preferably air, although other inert gases such as nitrogen may also be employed. The length of the gaseous gap is commonly in the range from 10 to 100 mm. Gas may be blown across the gaseous gap. The coagulating bath typically comprises aqueous NMMO. The washing and drying steps may be performed in any convenient manner.

The extruded lyocell article may take the form of fibres, for example in the form of continuous filament yarn, tow or staple fibres, or of film in the form of sheet or tube. In the case of fibres, the extrusion die or spinnerette typically comprises holes of diameter in the range from 50 to 200, often 70 to 120, micrometer.

We have found in general that the value of the ratio PFI/JFI increases with increasing polydispersity (broader D.P. distribution) of the cellulose. The value of this ratio can therefore be increased by mixing celluloses of different D.P. or by selecting a source of cellulose which has an inherently broad D.P. distribution. The former of these alternatives is generally preferred at the present day, because we have found that commercially-available dissolving pulps provide values of PFI/JFI within the range from 0.5 to 0.8. It is generally preferred that the D.P. distribution should be skewed towards the low end of the range. We have estimated that the PFI/JFI ratio of the cellulose mixtures disclosed in EP-A-0,648,808 lies within the range from 0.3 to 0.8.

When a mixture of sources of cellulose is used, we have found that the value of PFI/JFI varies to some extent with the average D.P. of cellulose in the mixture. In general, we have found that the ratio does exhibit a maximum at an average D.P. falling between the average D.P.'s of the individual sources of cellulose which form the mixture, and operation at or close to this maximum is to be preferred. Mixtures comprising a low-viscosity cellulose component of average D.P. in the range from 200 to 750, preferably from 250 to 500, and a high-viscosity cellulose component of average D.P. in the range from 800 to 1500 may be preferred. The D.P. of the low-viscosity cellulose component is generally at the lower end of or below the normal commercial range for dissolving pulp. The viscosity of cellulose raw material may be reduced if desired by such known techniques as irradiation, steam explosion, chemical treatment (including in particular acid hydrolysis and oxidative chain scission) or enzymatic treatment (e.g. using a cellulase). Alternatively, previously-processed cellulose material, for example waste viscose rayon, may be used as part or all of the low-viscosity component.

The breadth of D.P. distribution of a single source of cellulose can if desired be increased by subjecting a proportion of the cellulose to one or more of the aforementioned techniques for reducing the viscosity of cellulose. Such a procedure may be employed on the cellulose itself (which may be preferred), or on a slurry or premix of cellulose in NMMO/water.

The value of JFI is preferably at least 0.1, further preferably at least 0.5, and is preferably no more than 10. A low value for JFI corresponds to a high back-pressure in the extrusion apparatus. A value of JFI within the range from 1.0 to 2.0 may be further preferred.

Modelling experiments indicate that the maximum value of the ratio PFI/JFI for practical purposes is about 6. These experiments also indicate that JFI may tend towards undesirably low values towards this end of the range for the ratio. A value of the ratio PFI/JFI within the range from 0.9 to 4 or from 1.0 to 2.0 may be preferred.

When a dope of the kind provided by the invention is substituted for a conventional dope in a lyocell manufacturing plant, we have surprisingly found that productivity can be substantially increased. Firstly, we have found that the substitution is generally attended by improved spinning stability. This can be turned to advantage by increasing the production rate through the extrusion head. Secondly, we have generally found that, under otherwise unchanged conditions, the pressure drop through the large-diameter pipework employed in the dope preparation and handling area decreases, whereas the back-pressure at the spinnerette remains unchanged or falls slightly. Accordingly, the cost of pumping dope through the dope transport system can be reduced; or, alternatively, the flow rate through the dope transport system can be increased without additional capital expenditure. Improved spinning stability permits the use of lower viscosity dope (for example of reduced cellulose concentration, reduced cellulose D.P. or increased temperature) without loss of product quality. As a consequence, pumping costs can be further reduced, or flow rate through the dope transport system can be further increased. We have found that such benefits can more than outweigh both the increased loading on solvent recovery processes imposed by reduced cellulose concentration and the need for increased dope flow rate for a given throughput of cellulose. In contrast, reducing the viscosity of a conventional dope (for example by reducing cellulose concentration or D.P. or increasing temperature) spun under optimised conditions generally results in reduced spinning stability.

Values of PFI and JFI and their ratio measured on an extruded lyocell article may be found to correlate with respective measurements on the source of cellulose.

In the following Test Methods and Examples, parts and proportions are by weight except where otherwise specified.

Test Method 1

Preparation of Solutions of Cellulose for Testing

A Z-blade mixer such as a Winkworth 8Z (Trade Mark) (4 liter working capacity) equipped with a vacuum connection and a heated jacket is employed. Jacket temperature is set at 100° C. The operating mixer is charged with a mixture nominally containing 60% NMMO and 40% water, a sample of cellulose, and a small amount of propyl gallate (thermal stabiliser) dissolved in isopropanol. The mixer is then operated for 5 minutes or more until a uniform slurry (premix) has been obtained. Vacuum (conveniently about 6.5 kPa (50 mm Hg) absolute pressure) is then applied to remove excess water and thus enable dissolution of cellulose. Mixing and evacuation are continued until a solution (dope) of refractive index 1.4895 and free from any excessive quantity of undissolved fibres has been obtained. This corresponds to nominal batch weight 2 kg and to a solution nominally containing 15% cellulose and 10% water. Cellulose content may be determined gravimetrically. The solution is allowed to cool and solidify, and it can conveniently be cut into chips and sieved in preparation for testing. Dope chips should be stored in sealed plastic bags in an air-tight container containing a small amount of silica gel as desiccant to avoid appreciable change in moisture content. For use in Test Methods 2 and 3, cellulose concentration of samples for testing should be 15±0.25%.

Test Method 1 is applicable to sources of cellulose such as dissolving pulp, cotton linters and regenerated or reconstituted cellulose articles such as fibre and films (preferably free from extraneous chemicals such as dyes and finishes).

Test Method 2

Determination of Pipe Flow Index (PFI)

Pipe Flow Index (PFI) is designed to assess the flow performance of a cellulose solution under low-shear conditions of the kind typically experienced in transfer pipework in a manufacturing plant. A higher value of PFI corresponds to a lower viscosity (and accordingly readier flow) under such low-shear conditions.

Dope chips are prepared according to Test Method 1. PFI is measured using a Bohlin VOR (Trade Mark) rheometer equipped with a high-torque measuring head (2000 g.cm maximum torque) and utilising 30 mm diameter/5.44° cone and plate geometry. A hollow cylindrical liquid-retaining shroud is detachably mounted on the perimeter of the plate, extending upwardly beyond the base of the cone. The instrument is heated to 105° C., and the measuring gap between the cone and plate is adjusted to 150 micrometer. Dope chips (approx. 5 g) are placed onto the plate, and the insulating covers are fitted to the instrument. The gap is then slowly adjusted to 600 micrometer, taking care to maintain the Normal force readout on the instrument below 20% to avoid damaging the equipment or sample under test. The covers are removed, and any excess solution removed from the outside of the cone and plate assembly. The covers are replaced, the gap is slowly adjusted to 230 micrometer (maintaining Normal force readout below 15%), and any excess dope is removed as before. Silicone oil (Dow Corning 200/10cs (Trade Mark)) is poured over the cone and plate assembly so as to cover the base of the cone (to inhibit loss of volatiles), and the covers are replaced. The gap is then slowly adjusted to 150 micrometer (maintaining Normal force readout below 10%). After allowing 10 minutes or so for thermal equilibration, steady state shear measurements are made under the following conditions: shear range 0.0927 to 9.27 $s^{-1}$ (11 points), delay time 180 s (strain), integration time 15 s, autozero on (10 s delay), continuous shear on. The experiment is repeated to confirm the results. A fresh sample of dope chips should be used for each set of measurements.

In preliminary experiments, it was determined that a shear rate of 1 $s^{-1}$ gave reliable results. The shear strain at this shear rate was determined by fitting a power law curve to the two data points immediately above and the two data points immediately below 1 $s^{-1}$, as follows:

$$\text{Shear stress} = A \times (\text{Shear Rate})^B$$

where A and B are derived constants. Following these preliminary experiments, a sample of dope containing 14.71 percent by weight cellulose for which the values of A and B were 1440 and 0.4195 respectively was selected as arbitrary control for use in calculating PFI according to the equation:

$$PFI = C_x/A_x \cdot A_s/C_s \cdot ((3B_s+1)/B_s)^{B_s} \cdot (B_x/(3B_x+1))^{B_x} \cdot 0.25^{(B_s-B_x)}$$

wherein the identifying letters s and x refer to the control sample and to the sample under test respectively, C represents the percentage of cellulose in the solution, and A and B are power law constants. The values of As, Bs and Cs are therefore 1440, 0.4195 and 14.71 respectively. The values of Ax and Bx are calculated by fitting a power law curve to the two data points immediately above and the two data points immediately below shear stress 1440 Pa. This equation makes allowance for shear thinning. The same woodpulp and dope were also used to establish the arbitrary standard of Test Method 3.

On occasion, the specified shear stress (1440 Pa) cannot be obtained within the specified strain range. For high-viscosity samples, a suitable lower strain range should be selected, and measurements should be made with delay time 180 s (constant). For low-viscosity samples, a suitable higher strain range should be selected. In the latter case, erroneous results may be obtained at the highest strains (shown by breakdown of linearity in the power law curve); if so, PFI can be determined by interpolation among or extrapolation from the three data points nearest to the specified shear stress.

A shear rate of $1~s^{-1}$ can be considered representative of the shear experienced by lyocell dopes during transport through factory pipework, although higher shear rates (for example, up to 10 or $20~s^{-1}$) may be experienced under some factory circumstances, and lower shear rates may be experienced in over-designed equipment (e.g. a pilot plant or a factory producing at low rate).

Test Method 3

Determination of Jet Flow Index (JFI)

This test is designed to assess the flow performance of a cellulose solution under high-shear conditions of the kind typically experienced in spinnerettes and other extrusion dies. A higher value of JFI corresponds to a lower viscosity (and accordingly a readier flow under a given pressure, or a lower back-pressure at a given flow rate) under such high-shear conditions.

Dope chips are prepared according to Test Method 1. JFI is measured using a specially-designed piece of equipment called a Jet Rheometer. This comprises a heated barrel equipped at one end with a feed of pressurised nitrogen gas and at the other end with a plate containing a single dope extrusion hole 100 micrometer in diameter. The barrel assembly is also equipped with a pressure relief device to guard against the potential hazard of exothermic degradation. The barrel is a stainless steel tube 150 mm long×20 mm internal diameter. A tubular stainless steel insert fixed in one end of the barrel defines an axial hole 8.5 mm in diameter and is stepped to provide a shoulder directed towards that end of the barrel. A stainless steel mesh filter (nominal pore size 40 micrometer) is supported by a perforated plate 3 mm thick containing 12×1.5 mm diameter holes (a breaker plate) seated on the shoulder. The filter and plate are retained in place on the shoulder by an extrusion head seating within the insert. The extrusion head defines an internal passageway comprising a frusto-conical portion 20.5 mm long tapering from 8.5 mm to 3.5 mm diameter and a cylindrical portion 2 mm long of 3.5 mm diameter, to the end of which the extrusion plate is secured. The extrusion plate is 1400 micrometer thick. The extrusion hole has the following specification: first frusto-conical section 400 micrometer deep, 45° cone angle (back face); second frusto-conical section 300 micrometer deep, 36° cone angle; third frusto-conical section 300 micrometer deep, 20° cone angle; fourth frusto-conical section 300 micrometer deep, 10° cone angle; 100 micrometer capillary, 100 micrometer in diameter (extrusion face).

Dope chips (25 g) are charged into the barrel at ambient temperature. The barrel is placed within a jacket preheated to 105° C., and it is maintained at this temperature for 30 minutes to permit the chips to melt. After this time, the chips are tamped down to remove excess entrained air. The Jet Rheometer is then maintained for a further 30 minutes at 105° C. to allow for completion of melting and for thermal equilibration. Nitrogen is then supplied to the barrel to force dope through the spinnerette hole. The dope emerging from the hole is collected in a tared vessel mounted on a top-pan balance (sensitivity 0.1 mg). The vessel contains a small amount of liquid paraffin to cover the collected dope and so minimise loss of volatile components. Dope flow is measured at nitrogen pressures (gauge) in the range from 40 bar ($4 \times 10^6$ Pa) down to 2 bar ($2 \times 10^5$ Pa) in 2 bar ($2 \times 10^5$ Pa) steps, the measurements being completed within 1 hour, and expressed in mg/s. The specified times should not be exceeded, in order to minimise the risk of degradation during the course of the experiment.

If desired, the experiment can be repeated in order to ensure that the results obtained were not erroneously influenced by partial hole blockage.

In preliminary experiments, it was found that an arbitrary standard dope containing 14.71% cellulose (made from the same cellulose as used to establish the arbitrary standard in Test method 2) required a nitrogen pressure of 25.3 bar ($2.53 \times 10^6$ Pa)(gauge) to provide a dope flow rate of 1 mg/s through the spinnerette hole. This pressure was accordingly adopted as an arbitrary standard for measuring JFI. JFI is calculated from the equation:

$$JFI = V \cdot C / 14.71$$

where V represents flow rate at the specified pressure in mg/s and C the percentage of cellulose in the dope. V is determined by linear interpolation between the recorded data points.

The invention is illustrated by the following Example:

EXAMPLE

Lyocell dope was made and spun in conventional manner in a pilot plant into 1.7 dtex fibre. Spinning speed was 75 m/min and spinnerette hole diameter 70 micrometer. Air was blown transversely into the air gap separating the spinnerette and the coagulating bath. Various two-component blends of woodpulp were used as starting material. The pressure drop between the spinning pump and the final filter (P psig) and the back-pressure in the spinnerette assembly (J psig) were measured to assess ease of transport through plant pipework and through the spinnerette respectively. (It will be appreciated that P and J are arbitrary measurements, whose absolute values are only relevant in this particular pilot plant.) The range of transverse air velocities over which spinning was stable was measured; a low minimum velocity corresponds to more stable spinning conditions. As a guide, reduction in minimum velocity from 14 to 7 units enables spinning throughput to be increased by about 20%. Other relevant details appear from Table 1.

TABLE 1

| Ref. | Pulp A Source | DP | % | Pulp B Source | DP | % | DP | PFI/JFI | CiD % | Temp. ° C. | Ppsig | J psig | Air velocity range |
|---|---|---|---|---|---|---|---|---|---|---|---|---|---|
| 1 | Viscokraft HV | 850 | 33 | Viscokraft LV | 470 | 67 | 600 | 0.7 | 15 | 105 | 86 | 720 | 14–47 |
| 2 | Estercell | 1020 | 30 | Viscokraft ELV | 415 | 70 | 600 | 0.86 | 15 | 105 | 88 | 735 | 7–35 |
| 3 | Estercell | 1020 | 30 | Viscokraft ELV | 415 | 70 | 600 | 0.86 | 15 | 105 | 93 | 769 | 7–38 |
| 4 | Estercell | 1040 | 14 | Viscokraft ELV | 415 | 86 | 500 | 0.92 | 15 | 105 | 27 | 595 | 15–40 |
| 5 | Estercell | 1020 | 14 | Viscokraft ELV | 415 | 86 | 500 | 0.92 | 15.7 | 105 | 57 | 730 | 14–47 |
| 6 | Estercell | 1020 | 30 | Viscokraft ELV | 415 | 70 | 600 | 0.86 | 15 | 113 | 46 | 720 | 15–47 |
| 7 | Estercell | 1020 | 30 | Viscokraft ELV | 415 | 70 | 600 | 0.86 | 13.6 | 105 | 45 | 650 | 12–47 |

Viscokraft HV, Viscokraft LV, Viscokraft ELV and Estercell are Trade Marks. Different viscosity grades of Estercell were used in runs 2–3 and 5–7 on the one hand and in run 4 on the other. Pulp D.P. is that quoted by the manufacturer or is derived from the viscosity grade quoted by the manufacturer. CiD represents cellulose concentration in dope. Run 1 represents a control experiment.

The tensile properties of all fibre samples were closely similar. Comparison of replicate runs 2 and 3 with run 1 shows improved spinning stability and productivity (reduced minimum air velocity), with similar flow behaviour (similar values for P and J). Comparison of run 4 with run 1 shows similar spinning stability but markedly reduced values for P and J. Average D.P. was lower in run 4 than in run 1, but nevertheless the value of P was remarkably low. Run 5 illustrates one way of taking advantage of the PFI/JFI ratio of run 4: an increased cellulose concentration returned J and spinning stability to similar values to those of run 1, whilst P remained considerably below that of run 1. Run 6 demonstrates an alternative way of taking advantage of the invention: an increased dope temperature resulted in similar values for j and spinning stability to run 1, but a markedly lower value for P. By contrast, the dope used in run 1 has poor spinning stability at this temperature. Run 7 demonstrates a further alternative way of taking advantage of the invention: a reduced cellulose concentration resulted in lower values of P and J without loss of spinning stability. The greater ease of transport permits a greater flow rate of cellulose through the plant, even though an increased flow rate of dope is required for a given flow rate of cellulose. This should outweigh any disadvantage resulting from increased load on the solvent recovery system.

What is claimed is:

1. A method for the manufacture of an extruded lyocell article which comprises the steps of:

(1) dissolving cellulose in an aqueous tertiary amine N-oxide solvent to form a solution;
   (2) extruding the solution through a die by way of a gaseous gap into a coagulating bath to form an extruded lyocell precursor;
   (3) washing the extruded lyocell precursor free from tertiary amine N-oxide; and
   (4) drying the washed lyocell precursor, thereby forming the extruded lyocell article, in which method the cellulose exhibits a ratio of Pipe Flow Index to Jet Flow Index in the range from 0.85 to 6.0.

2. A method according to claim 1, wherein the ratio of Pipe Flow Index to Jet Flow Index is in the range from 0.9 to 4.0.

3. A method according to claim 2, wherein the ratio of Pipe Flow Index to Jet Flow Index is in the range from 1.0 to 2.0.

4. A method according to claim 1, wherein the value of the Jet Flow Index of the cellulose is in the range from 0.1 to 10.

5. A method according to claim 1, wherein the cellulose comprises a mixture of celluloses of different D.P.

6. A method according to claim 1, wherein the extruded lyocell article takes the form of a fibre.

7. A method according to claim 4, wherein the value of the Jet Flow Index of the cellulose is in the range from 1.0 to 2.0.

8. A method according to claim 5, wherein the cellulose is a mixture of (a) a first cellulose of D.P. in the range from 200 to 750 and (b) a second cellulose of average D.P. in the range from 800 to 1500.

9. A method according to claim 8, wherein the D.P. of the first cellulose (a) is in the range from 250 to 500.

* * * * *